United States Patent [19]

Van Vliet et al.

[11] 4,441,105
[45] Apr. 3, 1984

[54] DISPLAY SYSTEM AND METHOD

[75] Inventors: James G. Van Vliet, La Habra; Frank M. Aralis, Fountain Valley, both of Calif.

[73] Assignee: Beckman Instruments, Inc., Fullerton, Calif.

[21] Appl. No.: 335,010

[22] Filed: Dec. 28, 1981

[51] Int. Cl.³ .............................................. G09G 1/24
[52] U.S. Cl. .................................... 340/750; 340/721; 340/717; 340/748
[58] Field of Search ............... 340/750, 794, 798, 799, 340/717; 178/15, 30; 340/721, 747, 748; 364/523

[56] References Cited

U.S. PATENT DOCUMENTS

| | | | |
|---|---|---|---|
| 3,653,028 | 3/1972 | Cuccio | 340/717 |
| 4,190,835 | 2/1980 | Buynak | 340/750 |
| 4,326,201 | 4/1982 | Enokizono | 340/717 |
| 4,338,599 | 7/1982 | Leininger | 340/721 |

OTHER PUBLICATIONS

Harold L. Baevrestad, Jr. and Clark C. Bruderer, "Display System Designed for Color Graphics", Hewlett-Packard Journal, Dec. 1980; pp. 25-32.
Clement C. Lo and Ronald W. Keil, "A Compact Thermal Printer Designed for Integration into a Personal Computer", Hewlett-Packard Journal, Jul. 1980; pp. 22-26.
Todd R. Lynch, "A New World of Personal/Professional Computation", Hewlett-Packard Journal, Jul. 1980; pp. 3-7.
James F. Bausch, "A High-Quality CRT Display for a Portable Computer", Hewlett-Packard Journal, Jul. 1980; pp. 19-22.

Primary Examiner—Gerald L. Brigance
Attorney, Agent, or Firm—R. J. Steinmeyer; R. R. Meads; G. T. Hampson

[57] ABSTRACT

A display system and method utilizing a common character generator among a plurality of display devices. Each display device generates address signals which are multiplexed and applied to the character generator. The output from the character generator is used to control the visual representation produced by each display device. A graphics memory of picture elements can be addressed for a composite display of graphics and alphanumeric characters by the various display devices.

10 Claims, 4 Drawing Figures

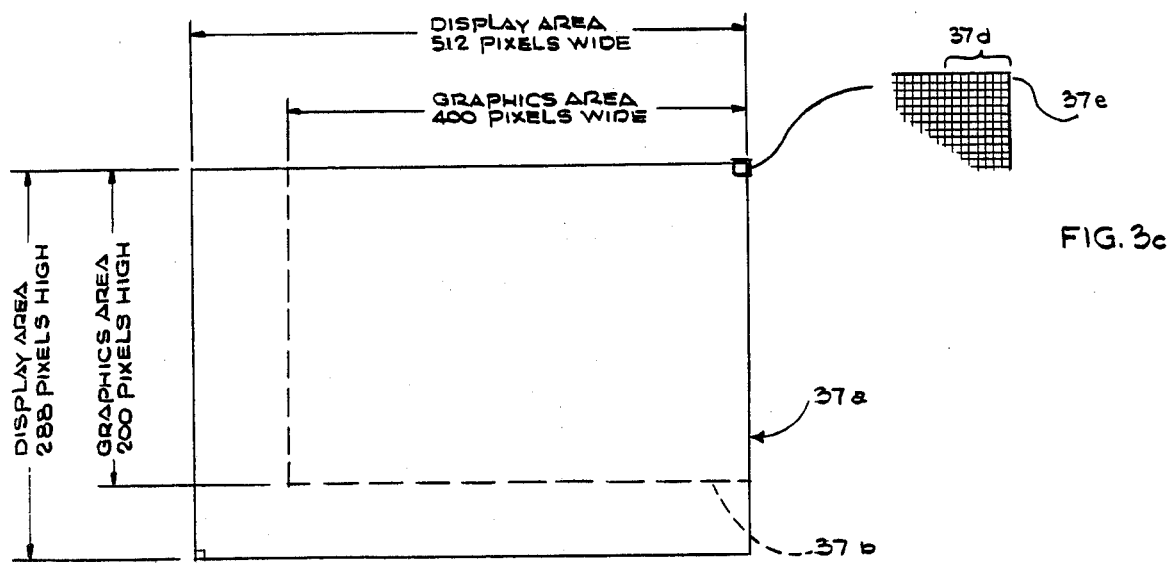
FIG. 3c
FIG. 3a
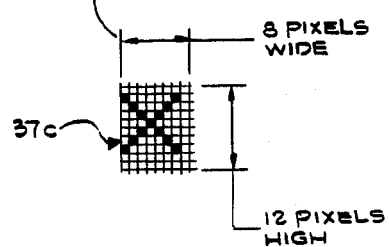
FIG. 3b

DISPLAY SYSTEM AND METHOD

BACKGROUND OF THE INVENTION

1. Field of the Invention

The present invention relates generally to display systems and, more particularly, to display systems employing a video display device and a hard copy device which produces a hard copy of the data shown by the video display device screen. The invention may be particularly advantageous where both graphic and alphanumeric data are displayed by the video display device and reproduced by the hard copy device.

2. Description of the Prior Art

Various display systems are known where a video display device is first used to manipulate the data displayed on the screen of the device and, once the data is satisfactorily arranged or otherwise processed, the data is then printed by a printer. Such systems allow corrections to be easily made in the displayed data and can provide a user with the ability to view numerous alternatives before a final printed copy is produced. Because the visual representation produced by the video display screen can be repeatedly and quickly modified, the relatively more time consuming process of producing the hard copy can be reserved for instances where the hard copy simply preserves the final desired data as seen on the screen of the display device. Examples of systems of this nature include word processing systems and computer aided design systems.

Where alphanumeric characters alone are to be copied by the hard copy device from the display device screen, it is often desirable that the alphanumeric characters produced by the hard copy device closely resemble the characters shown on the screen. This may be particularly useful where, for example, a particular character font is in use or where the alphanumeric characters include special or unique characters. Generally it has been the practice to employ a dedicated character generator within the hard copy device to generate the alphanumeric characters produced thereby. Where this is the case, the hard copy device character generator must exactly match the character generator within the video display device. Such a requirement can increase the costs of a video display system by requiring a non-standard character generator to be used in the hard copy device.

Where the video display screens in such systems are adapted to show composite displays of alphanumeric characters and symbols along with graphics, it is necessary that the hard copy device produce a composite copy of the entire screen. Several systems for solving this problem have been previously used.

For example, the entire screen of the display device may be considered a matrix of picture elements (pixels) which are turned on or off. By turning on or off selected ones of the pixels, a matrix image is defined which can include both graphics and alphanumeric characters. In such an instance, a hard copy device need only reproduce the pixels on a one-for-one basis to thereby copy the composite graphic and alphanumeric display.

With such systems, however, it is difficult to manipulate only the graphics portion of the image or only the alphanumeric characters. For example, if it is desired to erase and replace the graphics portion of the display image, the entire display image must be cleared. Then, any alphanumeric characters must again be written into the pixel matrix in addition to the new graphics, thus requiring additional processing time. On the other hand, similar difficulties are encountered if only the alphanumeric characters are to be replaced or varied. In this instance, the graphics portion of the display image must be redrawn, creating a particular difficulty where the data necessary for the graphics display image is no longer available.

An alternative solution to this problem is essentially the converse of the first solution. That is, instead of treating the entire video display screen as a matrix of individually selectable pixels, the display image or screen is defined as a matrix of characters each comprising a smaller matrix or cell of pixels. The characters can be alphanumeric characters or graphic elements used to form a portion of an overall graphic image. To then reproduce the video display image, the hard copy device reproduces the characters displayed on the screen without regard as to whether the character is alphanumeric or is a graphic element. With systems of this nature, however, the graphics characters are often extremely limited and are not suitable for applications requiring high resolution graphics. In particular, the graphics characters are generally formed by turning on or off blocks of pixels within the character cell. For example, one such graphics character may be formed by turning on the pixels in the upper half of the character cell while turning off the pixels in the lower half. Because blocks or groups of pixels are controlled within the character cell, high resolution graphics requiring control of individual pixels on the video display screen cannot be produced.

Yet a third solution to the above-identified problem is to use separate memories to store the alphanumeric characters and the graphic portion of the display image yet simultaneously display them on the display device screen. When the image shown on the screen is to be copied by the hard copy device, the device then first reproduces the graphics memory and then reproduces the alphanumeric character memory. This type of system typically employs a plotter as a hard copy device and is not suited for applications employing a dot matrix printer. This distinction exists because the plotter is able to return to a portion of the hard copy as often as is necessary in order to produce a composite copy of the alphanumeric characters and graphics. Dot matrix printers, on the other hand, are commonly designed to pass over each portion of the hard copy only once, thus making it substantially impossible to accurately return to a previously printed portion of the hard copy. Although a plotter can produce a composite image in systems of this type, plotters are generally slower and more costly than dot matrix printers.

Thus, there is a need for a video display system which can accurately reproduce the characters shown on a video display device screen. Moreover, there is a need for such a system employing a dot matrix type hard copy device that can copy a composite display of alphanumeric characters and graphics. Furthermore, it is desirable that such a system allows the displayed alphanumeric characters and graphics to be separately manipulated. The present invention overcomes the limitations described above and meets these needs.

SUMMARY OF THE INVENTION

The present invention resides in a system and method that accesses a single character generator to provide an output both for a video display device and a hard copy device. The system is suited for producing hard copies of composite alphanumeric characters and graphics using a dot matrix printer. The alphanumeric character font for both the video display device and the hard copy device is controlled by the single character generator, simplifying the overall system and decreasing the system cost. The need for additional character generators in the system with the consequential memory cost is eliminated.

To the foregoing ends, the present invention is embodied in a video display system that is adapted to provide control signals to a video display device and a hard copy device which each produce a visual representation comprising a plurality of picture elements arranged in a matrix. A single character generator is selectably responsive either to a video display controller or to a printer controller. The character generator provides output bits corresponding to a predetermined portion of the matrix of picture elements displayed by the display device or printed by the hard copy device.

In a preferred embodiment, the video display system also includes a graphics memory which is selectably accessible by the video controller or the printer controller. The respective controllers combine the outputs from the character generator and the graphics memory to provide a composite image for the video display device or the hard copy device. A single separate alphanumeric character meomory allows the alphanumeric character memory and the graphics memory to be separately accessible so that one may be individually manipulated without influencing or affecting the other. In the preferred embodiment, the alphanumeric character pixels and the graphics pixels bear a one-to-one correspondence to each other, further simplifying the production of a hard copy by a hard copy device such as a dot matrix printer.

BRIEF DESCRIPTION OF THE DRAWINGS

FIG. 3A is a diagram of the display area generated by the exemplary embodiment described herein.

FIG. 3B is an enlarged diagram of a portion of the display area of FIG. 3A depicting a character cell or matrix.

FIG. 3C is an enlarged diagram of a portion of the upper right-hand corner of the display area of FIG. 3A.

DESCRIPTION OF THE PREFERRED EMBODIMENT

Figure 1:
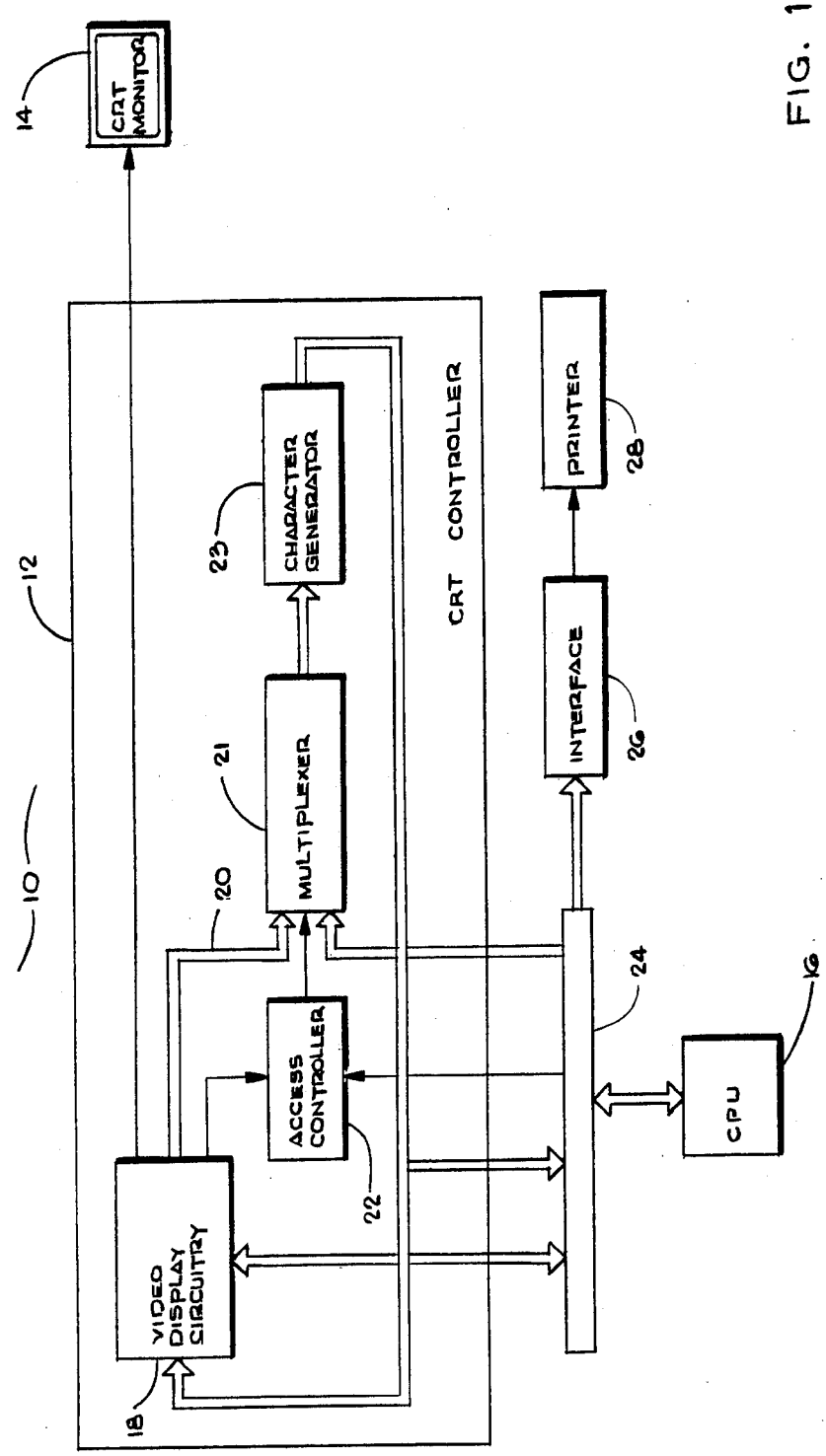
FIG. 1 is a simplified block diagram of a video display system in accordance with the present invention.

Briefly, a video display system 10 embodying the present invention is shown in FIG. 1. In the system 10, a CRT controller 12 generates a composite video signal that is applied to a CRT monitor 14. The CRT monitor 14 is a conventional raster scan device and is controlled by the CRT controller 12 to display dot matrix alphanumeric characters in a manner that is well known in the art. A CPU (central processing unit) 16 communicates with the CRT controller 12 to change or control the particular alphanumeric dot matrix characters displayed by the CRT monitor 14, also in a manner that is well known in the art.

More particularly, the CRT controller 12 includes video display circuitry 18 which produces a plurality of character address signals applied via an address bus 20 to a multiplexer 21. The video display circuitry 18 further generates an access control signal that is applied to an access controller 22 indicating that the video display circuitry 18 requires access to a character generator 23. In response to the acess control signal from the video display circuitry 18, the access controller 22 produces a select signal which is applied to the multiplexer 21, causing the multiplexer 21 to apply the character address signals on the bus 20 to the character generator 23.

The character generator 23, as is well known in the art, is a read-only memory device that responds to a predetermined combination of input character address signals to produce a plurality of output bits corresponding to predetermined picture elements (pixels) within a character cell or matrix of pixels. The character matrix of pixels is arranged as a fixed number of rows and columns producing well-known dot matrix characters formed by selecting predetermined ones of the pixels to be active or "on" while others are inactive or "off". In the embodiment of FIG. 1, the output bits from the character generator 23 correspond to one row of pixels within the character matrix. The particular dot matrix character and the row within the character matrix is selected by the combination of address signals applied to the character generator 23. Each dot matrix character stored in the character generator 23 requires a number of address signal combinations equal to the number of rows of the character matrix. This produces a corresponding number of groups of output bits which together equal the number of pixels in the character matrix. The output bits from the character generator are applied to the video display circuitry 18.

The output bits from the generator 23 are serialized by the video display circuitry 18 and become part of the composite video signal applied to a CRT monitor 14. The monitor 14 includes a display screen (not shown) which produces a visual representation or display image in accordance with the composite video signal. As noted previously, the CRT monitor 14 is a conventional raster scan device that forms a display image by successively scanning a plurality of adjacent horizontal lines, each horizontal line in turn comprising a plurality of adjacent pixels. A dot matrix character is displayed in the display image by successively displaying the rows of the character matrix for the dot matrix character on adjacent horizontal lines to form a complete dot matrix character.

In the embodiment of FIG. 1, sixty-four dot matrix characters are displayed on each line of text shown by the CRT monitor 14. Thus, for each horizontal line scanned by the CRT monitor 14, the video display circuitry 18 sequentially generates sixty-four combinations of address signals that are applied through the multiplexer 21 to the character generator 23. Each address signal combination identifies the dot matrix character and row of the character matrix. The resulting sixty-four groups of output bits from the character generator 23 are then combined by the video display circuitry 18 to form the composite video signal for that horizontal line. The video display circuitry 18 continues addressing the character generator 23, varying the addressed signals according to the dot matrix character and pixel row within the character matrix required. In this way complete rows of dot matrix characters are displayed in the display area.

The CPU 16 is in communication with the video display circuitry 18 via a main or master bus 24. As is described more fully with reference to FIG. 2, the main bus 24 can comprise separate data and address buses and may further include a control bus. The CPU 16 stores character codes into a character memory within the video display circuitry 18. These character codes in turn control the particular dot matrix characters to be displayed by the CRT monitor 14.

It is thus seen that to this point, the CRT controller 12 and the CPU 16 are of generally conventional design and are thus well-known in the art. However, as is explained more fully with reference to FIG. 2, the multiplexer 21 uniquely provides access by the CPU 16 to the character generator 23. This advantageously allows the character generator 23 to control dot matrix characters displayed both by the CRT monitor 14 and printed by a dot matrix printer 28.

With respect now to the hard copy aspect of the present invention, the CPU 16 communicates via the main bus 24 with an interface 26. The interface in turn converts the data provided by the CPU 16 into a serial control signal that is applied to the printer 28. The printer 28 is of conventional design and employs a print head which is moved across paper and prints dots on the paper positioned according to the control signal from the interface 26. To generate this control signal, the CPU 16 first reads from the character memory within the video display circuitry 18 the character code for the particular dot matrix character that is to be printed by the printer 28. The CPU then generates a second plurality of character address singnals which are applied through the main bus 24 to the multiplexer 21. The CPU 16 also generates an access request signal that is applied to the access controller 22 indicating that the CPU 16 requires access to the character generator 23. When the video display circuitry 18 no longer requires access to the character generator 23, the access controller 22 produces the select signal controlling the multiplexer 21 to apply the second plurality of character address signals from the CPU 16 to the character generator 23. The output bits then generated by the character generator 23 are communicated via the main bus 24 to the CPU 16. It is to be noted that the character code read from the character memory within the video display circuitry 18 determines the particular dot matrix character to be printed. Additionally, the CPU 16 stores internally the row within the character matrix required to form the control signal. Consequently, the CPU 16 forms the complete second plurality of character address signals which are applied through the multiplexer 21 to the character generator 23 to thereby access the correct output bits from the character generator 23.

The output bits from the character generator 23 are manipulated by the CPU 16 to form a portion of the control signal sent via the interface 26 to the printer 28 to thereby control the dots produced by the printer 28. This manipulation is described below with reference to FIGS. 3A–3C and 4. By repeatedly accessing the character generator 23, the CPU 16 utilizes the output bits from the character generator 23 to directly control the dots printed by the printer 28. Thus, the character generator 23 is utilized by the CPU 16 to control the dot matrix characters formed by the printer 28.

As is described below with reference to FIG. 2, the video display system 10 includes a graphics portion accessible by the video display circuitry and CPU for producing a composite display of graphics and characters on the CRT monitor 14 and the printer 28.

It is seen that the single character generator 23 is used both by the CRT controller 12 and the CPU 16. The output bits from the character generator 23 are used either to control the display image of the CRT monitor 14 or to control the dots printed by the printer 28. The use of a single character generator 23 reduces the number of components required in the video system 10 and allows for easy alteration of a character font produced by the CRT monitor 14 and the printer 28 by simply changing the single character generator 23. Moreover, by using the single character generator 23, the hard copy produced by the printer 28 can more closely match the appearance of the characters displayed on the screen of the CRT monitor 14.

Figure 2:
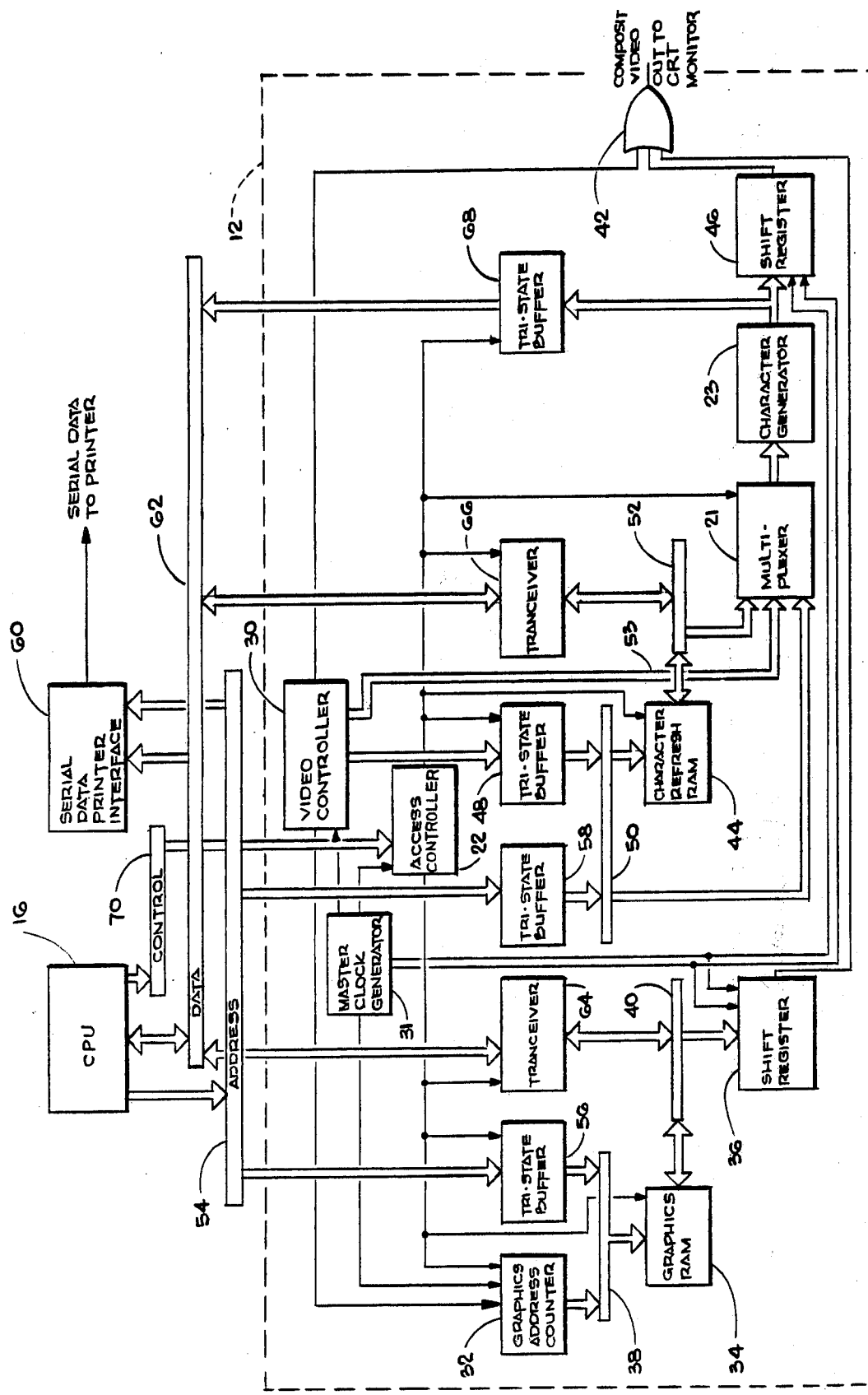
FIG. 2 is a detailed block diagram of the system of FIG. 1.

Turning now to FIG. 2, the exemplary video display system of the present invention is shown in greater detail. A dedicated video controller 30 has overall control of the functions of the video display circuitry 18 shown in FIG. 1. The video controller 30 controls and synchronizes both the graphics portion and the character generation portion of the video display circuitry 18. The video controller 30 can be a type 6845 manufactured by Motorola, Inc., and as is described in The Complete Motorola Microcomputer Data Library, copyright 1978, p. 1-159. As is well known in the art, the video controller 30 generates synchronizing and various address signals. For example, the video controller generates horizontal and vertical synchronizing and blanking pulses which form part of the composite video signal applied to the CRT monitor 14. These pulses synchronize the raster scan CRT monitor 14 in a well-known fashion. Also, the controller 30 generates sequential address signals and row address signals which are used to generate the character address signals for the character generator 23. Moreover, the video controller 30 is responsible to various control signals (not shown) to control its operation.

A master clock generator 31 generates the clock signals used throughout the CRT controller 12. In the embodiment shown herein, the clock generator provides a 1.427 MHz clock signal to the video controller 30. Also, several clock signals are applied to the access controller 22. These clock signals indicate when the memory portions of the CRT controller 12 are not being accessed by the CRT controller 12. Consequently, using conventional digital logic elements, these clock signals control the access controller 22 to allow the CPU 16 to access the memory portions of the CRT controller 12 when such access will not interfere with the generation of the composite video signal.

As described previously, the display area of the CRT monitor 14 comprises a plurality of pixels which are controlled to thereby display both dot matrix characters and graphics. The graphics can comprise, for example, various shapes, forms, or lines which are depicted in a manner similar to forming dot matrix characters by controlling the state (i.e., "on" or "off") of pixels within the display area. Such graphics displays are generally well known in the art and are widely used in personal computers and graphics display terminals. In FIG. 3A, 37a depicts the entire display area of the CRT monitor 14. By way of example, the display area 37a is selected to be 512 pixels wide and 288 pixels high, although other suitable ratios can be used. Within this display area 37a, a character matrix 37c is selected to be eight pixels wide by twelve pixels high. It is to be noted that the character matrix 37c allows twenty-four lines of sixty-four dot matrix characters each (within the 8×12 pixel matrix) to completely fill the display area 37a. Thus the display area 37 a may also be termed a character area. The upper right-hand portion of the display area 37a defines a graphics area 37b comprising 400 pixels in width and 200 pixels in height. Both the graphics area and the character matrix can be varied to thus vary the resolution or density of the dot matrix characters and graphics and the particular ratios or dimensions given hereinbefore are only illustrative.

With respect first to the graphics display portion of the video display system, the graphics display circuitry generally comprises a graphics address counter 32 (FIG. 2), a graphics RAM (random access memory) 34, and a shift register 36. The graphics address counter 32 counts clock pulses from the master clock generator 31 and generates sequential address signals which are applied to an address bus 38. The graphics address counter 32 preferably has outputs that are three-state or tri-state as is known in the art. The first two states correspond to binary zero or one while the third state is a high-impedance state which allows another device (a tri-state buffer 56 in the embodiment of FIG. 2) to apply address signals to the bus 38. The access controller 22 can control the graphics address counter 32 to place all of its outputs in the third state to thereby relinquish the address bus 38 to the tri-state buffer 56, the purpose of which is described hereinbelow. The address bus 38 in turn connects the address signals to the graphics RAM 34. In the embodiment of FIG. 2, the graphics RAM 34 comprises 10,000 eight-bit words (bytes) which correspond to the 80,000 pixel graphics area 37b depicted in FIG. 3A. These graphic RAM bytes are arranged for sequential addressing by the graphics address counter 32. The access controller 22 provides a signal to the graphics RAM 34 which controls the read/write status of the latter. When graphics data is to be read from the graphics RAM 34 for generation of the composite video signal, the control signal applied to the graphics RAM 34 enables the RAM to produce a data output byte.

The data output byte from the graphics RAM 34, comprising a single eight-bit byte, is applied to a graphics data bus 40 which in turn connects the byte to the shift register 36. The byte is loaded into the shift register 36 by a load signal from the master clock generator 31. Clock signals from the generator 31 then clock the shift register 36 to convert the eight-bit byte (parallel format) to a serial stream of individual bits (serial format). This serial stream is applied to an OR gate 42 which combines the serial stream of graphics data bits with other signals to form a composite video signal as described below.

With respect now to the character generation portion of the video display system, this portion generally comprises the video controller 30, a character refresh RAM (random access memory) 44, the multiplexer 21, the character generator 23, and a shift register 46.

The video controller 30 generates sequential address signals which are applied to a tri-state buffer 48. More particularly and as described hereinbefore, the character area of the display area 37a can display twenty-four rows of dot matrix characters, each such row including sixty-four dot matrix characters. Thus, for each horizontal line to be produced by the CRT monitor 14, the video controller 30 generates sixty-four sequential address signal combinations corresponding to sixty-four dot matrix characters that are included on that horizontal line.

The tri-state buffer 48 is a tri-state device as previously described. The access controller 22 applies a control signal to the buffer 48 that enables the address signals from the video controller 30 to be applied to a refresh address bus 50 when data is required from the character refresh RAM 44 for ultimate generation of the composite video signal. The address signals on the refresh address bus 50 are in turn applied to the character refresh RAM 44 and to the multiplexer 21.

As with the graphics RAM 34, the character refresh RAM 44 comprises a plurality of alterable addressable memory locations. Each memory location or address stores one eight-bit binary character code or byte corresponding to one of the 1,536 dot matrix character locations (twenty-four rows of sixty-four characters) in the character area of FIG. 3A. For example, the character codes can be ASCII (American Standard Code for Information Interchange) corresponding to alphanumeric characters, signs and various control commands. Similar to the graphics RAM 34, the access controller 22 applies a control signal to the character refresh RAM 44 which controls its read/write status to thereby provide an output byte of binary code. This character code output from the character refresh RAM 44 is connected to a character address bus 52 which is in turn connected to the multiplexer 21. The video controller 30 also generates a plurality of row address signals on lines 53 which are applied to the multiplexer 21. The row address signals determine which row of the character matrix is required to form the particular horizontal line to be produced by the CRT monitor 14. The row address signals, along with the character code signals on the bus 52, comprise the character address signals which can be applied through the multiplexer 21 to the character generator 23.

In the embodiment of FIG. 2, the multiplexer 21 is controlled by the access controller 22. In particular, the access controller 22, in response to the state of the clock signals from the master clock generator 31, controls the multiplexer to apply the character code from the character refresh RAM 44 and the row select signals from the video controller 30 to the character generator 23. This occurs when the output from the character generator 23 is required in order to form the composite video signal. At other times, as is discussed hereinbelow, the CPU 16 can access the character generator 23.

The character generator 23, as described previously, in response to the character address signals applied thereto, generates an eight-bit data output word which is applied to the shift register 46. The eight bits comprising the output bits from the character generator 23 correspond to one row of pixels for a particular dot matrix character, the row and dot matrix character being determined by the address signals applied to the character generator 23. Similar to the shift register 36, the shift register 46 loads the output byte in response to a load signal from the clock generator 31 and converts the eight-bit data output from the character generator 23 to a stream of serial data clocked at a rate determined by a clock signal from the clock generator 31. The serial data is applied to the gate 42. The shift registers 36 and 46 are synchronized by the load and clock signals from the clock generator 31 such that the eight-bit bytes loaded into each of the registers are shifted out at the same frequency and are synchronized bit-for-bit, that is, the first bit from each of the registers 36 and 46 are applied to the gate 42 at the same time.

Furthermore, the video controller 30 resets the graphics address counter 32 at the beginning of each raster scan, that is, as the CRT monitor 14 begins to scan the display area 37a of FIG. 3A. In the embodiment disclosed herein, this is done by applying a reset signal to the graphics address counter 32 that is derived from the vertical synchronizing pulse generated by the video controller 30. This synchronize the graphics address counter with the sequential address signals and row address signals generated by the video controller such that the bytes loaded into the shift registers 36 and 46 correspond to the same pixels in the graphics area 37b of FIG. 3A. For example, as shown in FIG. 3C depicting the upper right-hand corner of the display area, to display right-handmost eight pixels 37d on a first line 37e of the graphics area 37b, the address signals generated by the graphics address counter 32 address the byte of the graphics memory 34 which produces a byte of graphics memory corresponding to those eight pixels. Similarly, the video controller 30 generates address signals which corresponds to this character location (first character row, right-most character) in the character refresh RAM 44. These address signals are applied through the buffer 48 to the character refresh RAM 44. The character code output from the character refresh RAM 44, along with the row select signals from the video controller 30, provide character address signals through the multiplexer 21 to the character generator 23. These signals produce data from the character generator 23 for the right-hand most eight pixels 37d on the first line 37e. Thus it is seen that graphics and dot matrix character data for the right-hand most eight pixels 37d on the first line 37e are loaded into the shift registers 36 and 46, respectively. As described previously, the clock pulses applied to these shift registers clock the contents out in a synchronized serial fashion. Both of the resulting serial signal trains are applied to the OR gate 42 which combines the applied signals to form the resulting composite video signal. In this way, the video display circuitry of the present invention provides one-to-one correspondence between graphics and character pixels and also combines both graphics and character data for display by the CRT monitor 14.

It is to be noted that the graphics area 37b of FIG. 3A occupies only a portion of the display area 37a. Consequently, the graphics address counter 32 delays the start of its count for each horizontal line on the CRT monitor 14 by a predetermined time period. In the embodiment disclosed herein, this delay corresponds to 112 pixels between the left edge of the display area 37a and the left edge of the graphics area 37b. This delay can be accomplished using any conventional circuitry such as counters as is well known in the art.

As described previously with reference to FIG. 1, the CPU 16 accesses the character generator 23 to control the dots printed by the printer 28. The CPU 16 also accesses the graphics portion of the video display circuitry 18 so that both graphics and characters can be printed by the printer 28. In the embodiment disclosed herein, the CPU 16 can be considered a printer controller because the CPU 16 specifically controls the dots produced by the printer.

The CPU 16 is a microprocessor-based system of conventional design including a microprocessor, read-only memory (ROM), and random access memory (RAM). In the embodiment disclosed herein, the microprocessor is a type 8088 manufactured by Intel, Inc. and the CPU 16 employs components from the family of devices designed to operate with and complement the 8088.

It is to be understood that the graphics RAM 34, the character refresh RAM 44 and the character generator 23 are memory mapped with respect to the memory addressable by the CPU 16. This is to say that the graphics and character refresh RAMs 34 and 44 and the character generator 23 occupy unique locations within the address signal range generated by the CPU 16.

Returning again to FIG. 2, the CPU 16 generates address signals which are applied to a system address bus 54. The address bus 54 is in turn connected to two tri-state buffers 56 and 58 and also to a serial data printer interface 60. The tri-state buffers 56 and 58 are conventional tri-state devices as previously described which are controlled by the access controller 22. When the CPU 16 does not have access to the buses 38 and 50, respectively, the access controller 22 controls the buffers 56 and 58 to place the outputs thereof in a high-impedance state, thereby effectively isolating the buses 38 and 50 from the address bus 54 signals. However, when the CPU 16 is given access to the buses 38 and 50, the buffers 56 and 58 buffer the address signals from the address bus 54 and apply the resulting signals to the buses 38 and 50. The serial data printer interface 60 is a conventional device that converts parallel data applied thereto into a serial data train in the known RS-232C format.

The CPU 16 also maintains bi-directional communication with a system bi-directional data bus 62. The data bus 62 is likewise in communication with two tri-state transceivers 64 and 66, a tri-state buffer 68 and the serial data printer interface 60. The transceivers 64 and 66 are conventional and provide tri-state operation as previously described. However, the transceivers 64 and 66 allow bi-directional data transfer between the buses 62 and 40 and the buses 62 and 52. The direction of data transfer is controlled by a control signal from the access controller 22. Specifically, when data is to be written by the CPU 16 into either the graphics RAM 34 or the character refresh RAM 44, the respective transceivers 64 and 66 gate data from the data bus 62 to the respective buses 40 and 52. Conversely, when the CPU is to read data from either of the RAMs 34 or 44, the respective transceivers 64 or 66 gate data from the RAMs 34 or 44 to the data bus 62.

Lastly, the CPU 16 is in communication with a system control bus 70 which provides control signals including an access request and data read or write control signals to the access controller 22. The access controller 22 is further responsive to clock signals from the master clock generator 31.

The access controller 22 provides access to the memory devices in the CRT controller 12 for the purpose of generating the composite video control signal in preference to access to the memory devices by the CPU 16. That is, the graphics address counter 32 is allowed access to the graphics RAM 34 and the video controller 30 is allowed access to the character refresh RAM 44 and the character generator 23 in preference to the CPU 16. This preference or priority is established by the clock signals from the master clock generator 31. As previously described, the master clock generator 31 generates load and clock signals that are applied to the shift registers 36 and 46. Immediately before the load signals are generated, the states of the clock signals developed by the master clock generator are processed in a conventional fashion by logic elements within the access controller 22. The resulting control signals developed by the access controller 22 control the graphics address counter 32, the tri-state buffer 56 and the transceiver 64 to apply the address signals from the counter 32 to the RAM 34. The resulting data from the RAM 34 is applied to the shift register 36 in time to be loaded into the latter. Similarly, the access controller 22 controls the tri-state buffers 48, 58 and 68, the transceiver 66 and the multiplexer 21 to apply the address signals from the video controller 30 to the RAM 44, and to apply the character code data from the RAM 44 and the row address signals to the multiplexer. The resulting character address signals are provided to the character generator 23 with the resulting output bits being applied to the shift register 46, again in time to be loaded into the shift register 46. When it is necessary for the CPU to access any of these portions of the video display circuitry, the CPU generates the access request signal and a read or write control signal via the control bus 70. Once the data is loaded into the shift registers 36 and 46, the access controller than allows CPU access to the RAMs 34 and 44 and the character generator 23 through the tri-state buffers 48, 56 and 68, the transceivers 64 and 66, and the multiplexer 21.

Access to these portions (i.e., the RAMs 34 and 44 and the character generator 23) is required by the CPU 16 for essentially three purposes. The first of these is to write or read graphics data into or from the graphics RAM 34 to thereby provide graphics within the graphics area 37b (FIG. 3A) and to print the graphics using the printer 28. This is accomplished by enabling the CPU 16 to address the graphics RAM 34 via the address bus 54, the tri-state buffer 56 and the bus 38. Data is then read from or written into the graphics RAM 34 from the CPU 16 via the data bus 62, the transceiver 64 and the bus 40.

Secondly, the CPU 16 is allowed access to the character refresh RAM 44 to write into that memory character codes so that the corresponding dot matrix character will appear on the CRT monitor 14 and, as will be described below, on the printed copy produced by the printer 28. This is accomplished by allowing the CPU 16 to address the character refresh RAM 44 via the address bus 54, the tri-state buffer 58, and the bus 50. Data is then written into or read from the character refresh RAM 44 via the bus 52, the transceiver 66 and the data bus 62.

Lastly, the CPU 16 is uniquely allowed to directly address the character generator 23 to read therefrom output bits for controlling the printer 28. This is done by providing character address signals via the address bus 54, the tri-state buffer 58, the refresh address bus 50 and the multiplexer 21 to the character generator 23. The output data from the character generator 23 is then applied to the CPU 16 through the tri-state buffer 68 and the system data bus 62.

Any conventional source of characters and graphics may be used by the CPU 16 for writing character codes and graphics into the character refresh RAM 44 and the graphics RAM 34. For example, the characters can be supplied from a keyboard or from preprogrammed routines stored by the CPU 16. The graphics can result from plotting various numerical data. Routines and algorithms for plotting lines into a matrix of pixels and other shapes are well known and will not be explained in detail here.

The CPU 16 addresses the character generator 23 to generate the dot matrix patterns required to control the dots printed by the printer 28. In the exemplary embodiment disclosed herein, the printer 28 reproduces the display area 37a shown in FIG. 3A by printing dots which correspond to the pixels of the display area 37a. More particularly, although the CRT monitor 14 scans the display area 37a in a conventional raster-scan sequence (left-to-right, top-to-bottom fashion), the printer 28 instead reproduces the display area by printing pixels from the bottom to the top and from the left to the right of the display area 37a. In an exemplary embodiment, the printer employs a print head having a fifteen dot capability, and thus prints fifteen columns of pixels of the display area on each pass across the paper within the printer.

To control the printing of dots by the printer 28, the CPU 16 transmits to the printer fifteen columns of pixels from the display area 37a. More particularly, the CPU transmits serial data to the printer, the serial data comprising thirty-six eight-bit bytes of binary data for each column. The columns are transmitted in order from the left to the right of the display area 37a.

Generally, the process by which the CPU 16 generates this serial data signal to control the printer requires first that the CPU 16 access the character refresh RAM 44 through the tri-state buffer 56 (FIG. 2). The address signals access a memory location within the RAM 44 corresponding to the portion of the display area that is to be printed. The character refresh RAM 44 then provides an output through the transceiver 66 to the CPU 16 of the character code for that area. The CPU 16, based on that character code and the row from the character matrix containing the dot required, generates address signals which are applied through the tri-state buffer 58, the bus 50 and the multiplexer 21 to the character generator 23. The character generator 23 in turn provides output bits through the tri-state buffer 68 to the CPU 16 for the specified character and matrix row. This output data is received by the CPU and, as is explained more fully hereinbelow, is manipulated to then form the serial data signal which is applied to the printer 28 to directly control the dots printed thereby.

By way of a more detailed example, the following operations are performed by the CPU 16 to generate the first eight bits of the serial data signal applied to the printer to reproduce the characters in the display area as shown on the CRT monitor 14. The CPU 16 first generates address signals that correspond to the memory location in the character refresh RAM 44 for the first dot matrix character on the last or twenty-fourth row of characters, that is, the character at the lower left-hand corner of the display area 37a. Assume that the character code for the letter "X" is stored at this location in the character refresh RAM 44 as represented by the corresponding ASCII code. These signals are applied to the tri-state buffer 56 and the access request signal along with a read command signal are applied to the access controller 22. The access controller 22, when the appropriate CPU access time occurs as described above, controls the graphics address counter 32 and the tri-state buffer 56 to apply the address signals to the RAM 34. A read command signal is applied to the RAM 34 and the character code is read from the character refresh RAM 44 through the transceiver 64 by the CPU 16.

To assemble the first byte of the serial data signal for the printer, the CPU must determine which of the eight lowermost pixels in the left-hand column of the display area 37a are activitated or "on", as may be represented by a binary one for the respective pixel. Using the character code just read from the character refresh RAM 44, the CPU generates new address signals which are applied via the address bus 54 to the tri-state buffer 58 along with the access request and read command signals to the access controller 22. Again, when CPU access is enabled, the address signals are applied through the tri-state buffer 58 and through the multiplexer 21 to the character generator 23. For example, the address signals first specify the lower-most matrix row of the "X". More particularly, assuming ASCII code for "X" is binary 01011000 and that the last row of the character matrix is specified as binary 1011, then the address signals include these binary groups along with additional signals that specify the character generator 23 within the CPU memory map or range of address signals. This address, applied to the character generator 23 as just described, produces eight bits from the generator 23. As seen in FIG. 3B, the left-hand most bit of the right bits in this row is "off" or inactive.

Similarly, the CPU 16 generates seven more combinations of address signals which, when applied to the character generator 23 as just described, produce an output from the character generator 23 corresponding to the bits in the next seven matrix rows of the character "X". Each of these groups (bytes) of output bits are read by the CPU 16 via the tri-state buffer 68 and the data bus 62. For each group the CPU takes or "strips" the bit which corresponds to the column of pixels presently being sent to the printer. In the example, the CPU 16 strips the first bit from the character generator output bytes because this bit is in the first column of pixels. For each output byte read from the character generator 23, the CPU 16 places the stripped bit into a new eight-bit byte, the position within the new byte corresponding to the row from which the bit originated. To carry the present example further and as seen in FIG. 3B, the fifth row up from the bottom includes an "on" or activated pixel in the first and seventh columns. The CPU, however, strips only the first bits from the eight bytes read from the character generator and consequently forms an eight-bit binary word of 00001000, the one in this binary word corresponding to the "on" or active bit in the first column, fifth row from the bottom in the character matrix.

This process is continued for each dot matrix character that includes the first column of pixels within the display area 37a, and for each row within each character. The CPU 16 strips from the output bytes from the character generator 23 the bits comprising the first pixel column to thus assemble a thirty-six byte data string. The data string is transmitted via the serial data printer interface 60 to the printer which receives and stores this first column of pixel information.

The CPU 16 then repeats the above-described process but strips from the character generator 23 output the bits in the remaining columns to form thirty-six byte data strings for each pixel column. For each completed column, the printer stores the serial data. In the exemplary embodiment described herein, once the printer 28 has stored data for fifteen such columns, the printer thereupon prints all fifteen columns of data, thus reproducing the contents of the first fifteen columns of pixels in the display area.

In brief summary, the CPU 16 accesses the character generator 23 to generate rows of character matrix information. The CPU 16 strips from these rows the particular bit corresponding to the column of pixels then being assembled. Adjacent bits in a column are assembled into consecutive bytes of serial data which is communicated to the printer to thereby control the hard copy produced by the printer 28.

Where a character to be printed resides within the graphics area 37b, the CPU 16 combines both the graphics pixels with the character pixels when generating the serial data signal. More particularly, once the CPU 16 completes the above-described process for a particular row of pixels within a character matrix, the CPU 16 generates address signals that address the memory location within the graphics RAM 34 which stores an eight-bit byte of pixel data occupying the same pixels as the row of pixels within the character matrix. The address signals are applied through the tri-state buffer 56 and the resulting eight-bit byte is read from the graphics RAM 34 via the tranceiver 65. The CPU 16 then strips from this type the bit corresponding to the column of pixels then being assembled by the CPU 16. The stripped bit from the character data and the stripped bit from the graphics data are combined using an OR funtion as is well known in the art, by programming instructions that control the CPU to perform a logic OR using the stripped bits. The result is then assembled as part of an eight-bit portion of the serial data signal communicated to the printer 28. This process is continued for each column of pixels until the entire display area 37a is reproduced by the printer 28.

It is to be recognized that either a character pixel in an "on" or active state or a graphics pixel in an "on" or active state will cause a corresponding dot to be printed by the printer 28.

Figure 4:
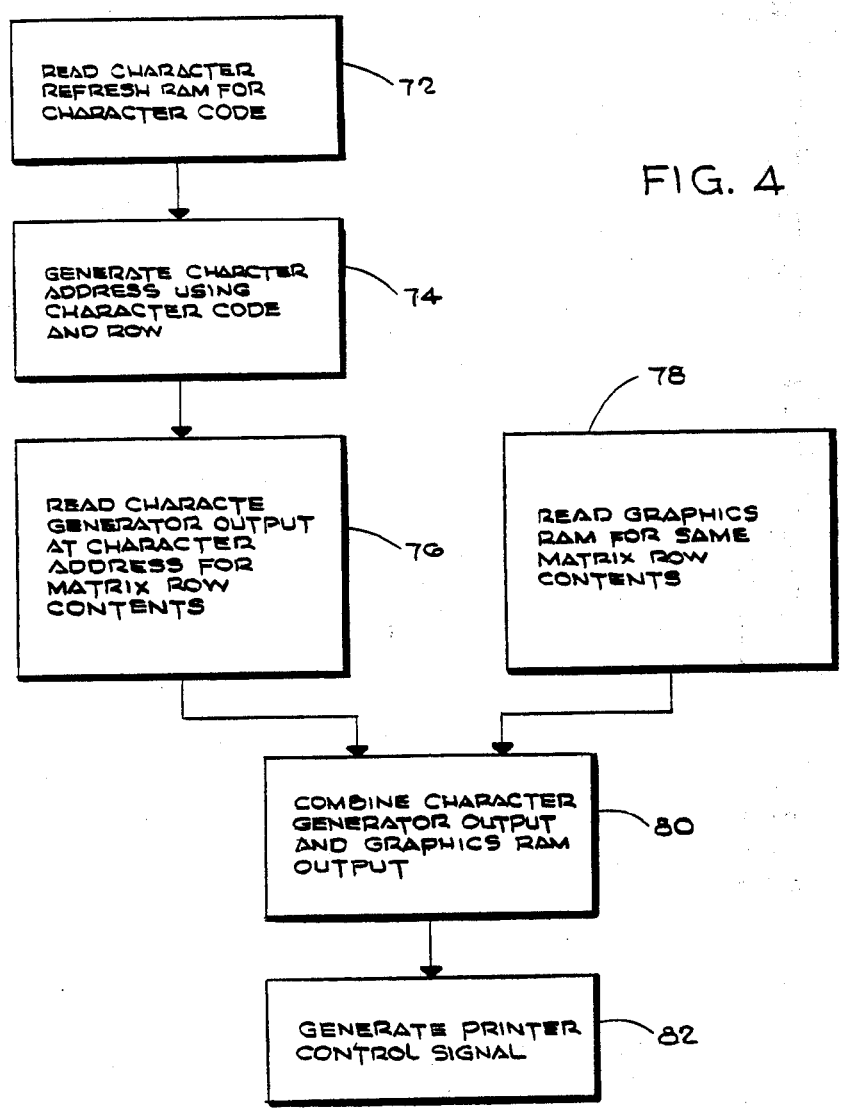
FIG. 4 is a diagram of a process for generating a printer control signal in accordance with the present invention.

The above-described process may be summarized with reference to FIG. 4. As shown by block 72, the CPU 16 first reads from the character refresh RAM 34 the character code for the particular area to be printed. The CPU 16 then generates a character address using in part the character code just retrieved and the row within the character matrix required (block 74). The character address is applied to the character generator 23 and the character generator output is read by the CPU 16 for the particular character matrix row contents (block 76). The CPU 16 also reads from the graphics RAM 34 the contents of the graphics RAM 34 corresponding to the same pixels occupied by the character matrix row just read from the character generator 23 (block 78).

The CPU 16 then combines the character generator output and the graphics RAM output (block 80) and generates therefrom the printer control signal (block 82).

Although the embodiment disclosed herein provides serial data to the printer, it will be recognized that parallel data may be instead applied to a printer adapted to receive such data. Also, the printer 28 may be a ballastic impact printer or a thermal dot matrix printer. Additionally, where a printer is used which scans or prints in the same direction as the CRT monitor 14, the data from the character generator 23 and the graphics RAM 34 can be simply taken row-by-row rather than requiring stripping by the CPU 16 into columns of pixels as described above.

Thus, a display system and method in accordance with the present invention provides a single character generator for use by a plurality of display devices. The single character generator decreases the overall memory requirements for the system, thus decreasing costs and providing a more simplified system. The use of a single character generator allows character fonts to be easily changed and provides more uniform displays amongst the various display devices. The method and system also enables graphics to be simultaneously displayed with alphanumeric characters, yet allows composite visual representations to be produced by the various display devices. Particularly, the present method and system can provide composite hard copies of combined graphics and alphanumerics displayed by the display device such as a CRT monitor.

While a preferred embodiment of the present invention has been illustrated and described, it will be understood that various modifications including those described above and others may be made therein without departing from the spirit and scope of the appended claims.

What is claimed is:

1. A video display system adapted to provide control signals to display means and printer means wherein the display means is for providing visual representations of a plurality of picture elements arranged in a matrix and the printer means is for printing a plurality of picture elements arranged in a matrix, and where charcters to be displayed are formed by a cell of picture elements, the system comprising:

character generator means responsive to coded signals for providing a plurality of output bits corresponding to a predetermined portion of the cell of picture elements;

selector means for selecting between first and second coded signals to provide one of the first or second coded signals to the character generator means;

video controller means for generating the first coded signals and for responding to the character generator means output bits when the first coded signals are applied to the character generator means to generate the control signal for the display means including the output bits;

printer controller means for generating the second coded signals and for responding to the character generator means output bits when the second coded signals are applied to the character generator means to generate the control signal for the printer means, the control signal including the output bits; and timing means for controlling the selector means.

2. A video display system as in claim 1 wherein the system further includes:

graphics memory means responsive to a plurality of address codes for storing a plurality of alterable bits corresponding to respective address codes, each bit corresponding to at least one picture element produced by the display means and the printer means;

means for applying either first or second graphics address codes to the graphics memory means;

the video controller means further including means for generating the first graphics address codes;

the printer controller means further including means for generating the second graphics address codes;

the video controller means including means responsive to the graphics memory bits when the first graphic address codes are applied to the graphics memory means for including the graphics memory bits in the display means control signal; and the printer controller means including means responsive to the graphic memory bits when the second graphics address codes are applied to the graphics memory means for including the graphics memory bits in the printer means control signal.

3. A video display system as in claim 2, wherein the printer controller means generates the second coded signals and the second graphics address codes such that the character generator means output bits and the graphic memory bits correspond to the same picture elements within the matrix of picture elements visually respresented by the display means and printed by the printer means.

4. A system as in claim 1 wherein the system further includes character memory means and access means responsive to the timing means for applying first or second character address codes to the character memory means, the character memory being responsive to the character address codes to provide a character code for each character address code, the video controller means additionally including means for generating the first character address codes such that the first coded signals comprise in part the character code from the character memory means when the first character address codes are applied to the character memory means, and the printer controller means additionally including means for generating the second character address codes such that the second coded signals comprise in part the character code from the character memory means when the second character address codes are applied to the character memory means.

5. A video display system as in claim 1, wherein the printer controller means additionally includes means for selecting a bit from the output bits according to the position of the bit within the output bits, the selected bit forming a portion of the printer means control signal.

6. A display method adapted to provide control signals to display means and printer means wherein the display means is for providing visual representations of a plurality of picture elements arranged in a matrix and the printer means is for printing a plurality of picture elements arranged in a matrix, and where characters to be displayed are formed by a cell of picture elements, the method including the steps of:

generating first coded signals, generating second coded signals, selecting between the first and second coded signals to provide one of the first or second coded signals as selected coded signals, providing a plurality of output bits in response to the selected coded signals, the output bits corresponding to a predetermined portion of the cell of picture elements, generating the control signal for the display means including the output bits when the first coded signals are the selected coded signals, and generating the control signal for the printer means including the output bits when the second coded signals are the selected coded signals.

7. The video display method of claim 6 wherein the method further includes:

generating first graphics address codes, generating second graphics address codes, selecting either the first or the second graphics address codes to provide selected graphics address codes, storing a plurality of alterable graphics memory bits corresponding to respective selected graphics address codes, each bit corresponding to at least one picture element produced by the graphics means and the printer means, including the graphics memory bits in the display means control signal when the first graphics address codes are the selected graphics address codes, and including the graphics memory bits in the printer means control signal when the second graphics address codes are the selected graphics address codes.

8. A method as in claim 6 wherein the method further includes generating first character address codes, generating second character address codes, selecting either the first or second character address codes as selected character address codes, generating a character code in response to the selected character address codes, generating the first coded signals including forming the first coded signals in part in response to the character code when the first character address codes are the selected character addres codes, and generating the second coded signals including forming the second coded signals in part in response to the character code when the second character address codes are the selected character address codes.

9. A video display system adapted to provide control signals to display means and printer means wherein the display means is for providing a display of a plurality of picture elements arranged in a matrix and the printer means is for printing the matrix of picture elements, and where characters to be displayed and printed are formed by a cell of picture elements, the system comprising:

video controller means for generating first character address codes and row select signals;

printer controller means for generating second character address codes;

selector means for selecting between the first and second character address codes to provide selected character address codes;

character memory means responsive to the selected character address codes for generating a character code output;

the printer controller means including means responsive to the character code output when the selected character address code comprises the second character address code for generating first character generator address signals including in part the character code output;

multiplexer means responsive to the character code output, to the row select signals and to the first character generator address signals to provide selected character generator address signals comprising either the character code output and row select signals or the first character generator address signals;

character generator means responsive to the selected character generator address signals for providing a plurality of output bits corresponding to a predetermined portion of the cell of picture elements;

the video controller means further including means responsive to the character generator means output bits when the selected character generator address signals comprise the character code output and the row select signals for generating the control signal for the display means including the output bits;

the printer controller means further including means responsive to the character generator means output bits when the selected character generator address signals comprise the first character generator address signals for generating the control signal for the printer means including at least in part the character generator means output bits; and timing means for controlling the selector means and the multiplexer means.

10. A display method adapted to provide control signals to display means and printer means wherein the display means is for providing visual representations of a plurality of picture elements arranged in a matrix and the printer means is for printing a plurality of picture elements arranged in a matrix, and where characters to be displayed are formed by a cell of picture elements, the method including the steps of:

generating first character address codes, generating second character address codes, selecting either the first or second character address codes as selected character address codes, generating a character code in response to the selected character address codes, generating first coded signals including forming the first coded signals in part in response to the character code when the first character address codes are the selected character address codes, and generating second coded signals including forming the second coded signals in part in response to the character code when the second character address codes are the selected character address codes, selecting between the first and second coded signals to provide one of the first or second coded signals as selected coded signals, providing a plurality of output bits in response to the selected coded signals, the output bits corresponding to a predetermined portion of the cell of picture elements, generating the control signals for the display means including the output bits when the first coded signals are the selected coded signals, and generating the control signal for the printer means including the output bits when the second coded signals are the selected coded signals.

* * * * *